July 30, 1963 G. H. KRESS ETAL 3,099,413

REEL MOUNTING ASSEMBLY

Filed Nov. 10, 1961 2 Sheets-Sheet 1

INVENTORS:
GEORGE H. KRESS
WALTER A. MENN

BY Mellin and Hanscom
ATTORNEYS

REEL MOUNTING ASSEMBLY

Filed Nov. 10, 1961 2 Sheets-Sheet 2

INVENTORS:
GEORGE H. KRESS
WALTER A. MENN
BY
Mellin and Hanscom
ATTORNEYS

United States Patent Office
3,099,413
Patented July 30, 1963

3,099,413
REEL MOUNTING ASSEMBLY

George H. Kress, Short Hills, and Walter A. Menn, Hillsdale, N.J., assignors to General Precision, Inc., a corporation of Delaware
Filed Nov. 10, 1961, Ser. No. 151,463
4 Claims. (Cl. 242—68.3)

This invention relates to a reel hub assembly for detachably securing a conventional form of tape reel to a support arbor or spindle. In brief, this invention involves a mounting assembly for tape reels and the like comprising a reel retaining member which is integrated with, and forms a permanent part of the supporting assembly itself. This feature is an improvement over the more conventional reel mounting devices having removable retainer parts that may be lost or misplaced. It is further believed that the particular cooperative relationships of the reel retainer member and other parts of the assembly enhance the operation of such devices, as well as contributing to ease of manufacture and assembly.

One object of this invention is to provide a reel hub assembly, comprising means for supporting a tape reel including a hub sleeve member and having a backing surface, means for keying said reel with said hub sleeve member, a reel retaining member having a facing surface and being mounted to said hub sleeve member for limited axial and angular movements relative thereto, biasing means urging said reel retaining member toward said backing surface, and means for locating said reel retaining member relative to said hub sleeve member in reel locking and reel unlocking positions.

A second object is to provide apparatus of the kind described including a reel retaining member and hub sleeve member having complementary grooves and means confined therebetween for limiting the degree of axial and angular movements of said reel retaining member.

Another object of this invention is to provide apparatus of the kind described including means providing angularly spaced locating slots and an associated locator pin for establishing reel locking and reel unlocking positions for a reel retaining member.

It is a further object to provide a reel hub assembly comprising a backing plate for supporting a tape reel and including a centrally formed hub sleeve member adapted to be rotatably mounted upon a spindle, a reel drum secured to said backing plate and providing a backing surface for a tape reel, a reel retaining member rotatably mounted on the axis of said hub sleeve member having lateral appendages complementary and registrable with slots provided in tape reels to be used with said hub assembly, said appendages providing facing surfaces for engaging a tape reel after said reel is mounted upon said reel drum and said reel retaining member is rotated, placing said appendages out of registration with the slots of the tape reel, a helical coil spring urging said reel retaining member toward said backing surface, and means for locating said reel retaining member relative to said hub sleeve member in reel locking and reel unlocking positions.

Other objects of this invention will become apparent in view of the drawings and the following detailed description.

In the drawings forming a part of this application and in which like parts are identified by like reference numerals throughout the same, FIG. 1 is a plan view of a preferred embodiment for a tape reel mounting with a conventional form of reel mounted thereon;

Figure 2:
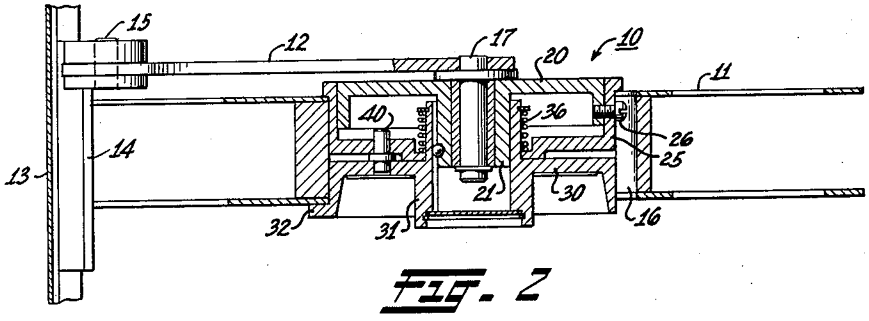
FIG. 2 is a section taken on line 2—2 of FIG. 1.
Figure 1:
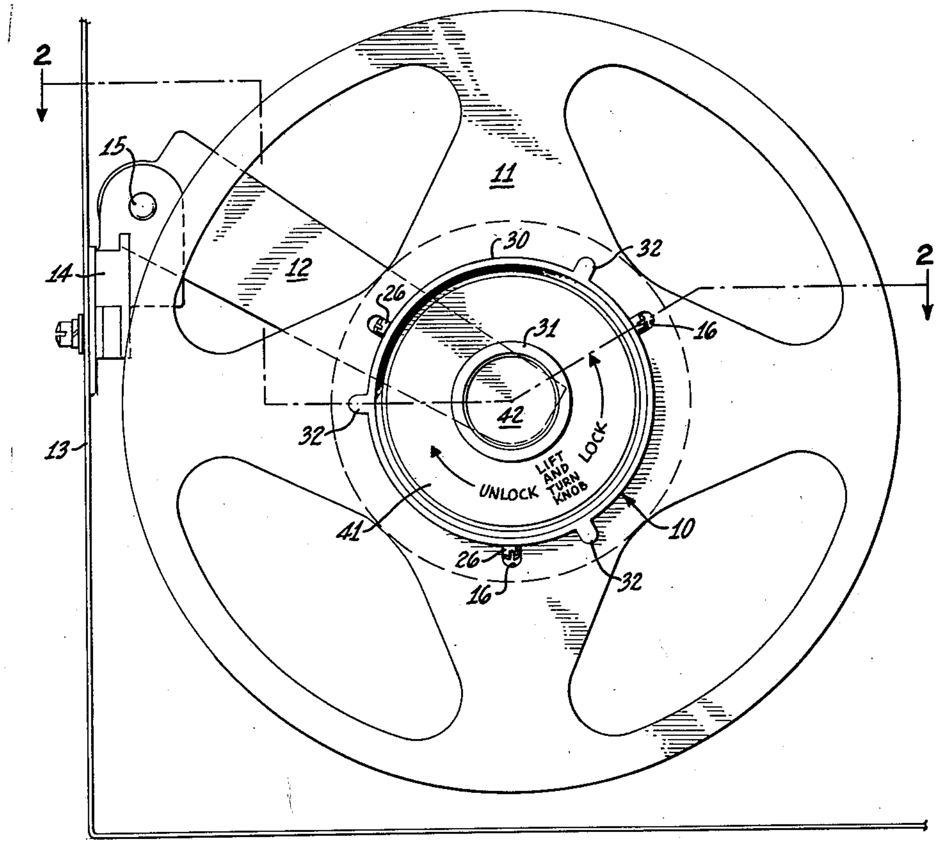

Referring to FIG. 1, there is shown a reel mounting assembly 10 embodying the concepts of this invention for rotatably mounting a tape reel 11 upon a pivoted arm 12. Arm 12 is supported from a housing frame 13 by conventional tape-guide and support arm connection 14, said arm being pivoted upon an axis 15. This general support arrangement may be used to mount National Association of Broadcasters standard tape reels as, for example, the reel 11 shown. It is to be noted that these reels have a plurality of registration slots 16 which allow the reel to be keyed to an arbor or mandrel. The use of these registration slots in connection with the present invention will be more particularly explained following a description of the apparatus shown.

Reel mounting assembly 10 is rotatably supported from arm 12 upon a spindle shaft 17 and includes a backing plate 20 having a backing surface, a centrally formed hub sleeve 21 and a cylindrical guide flange 22. A bushing 23 is disposed internally of sleeve 21 and engages spindle shaft 17, allowing a substantially free rotation of the assembly. It will be noted that a spring retainer clip 24 is used to secure the backing plate onto the spindle.

Backing plate 20 supports a reel drum 25 which is secured thereto by three radially directed set screws 26. Screws 26 are spaced at equal angular distances around the peripheral drum surface in the same arrangement as the slots 16 are formed in the conventional reel 11. Thus, as shown in FIG. 1, the heads of screws 26 may be placed into simultaneous registration with the slots 16. Drum 25 is formed with a radial backing flange 27 that provides a backing surface 28 against which the tape reel is confined. The drum also includes a cover and retainer plate 29.

Assembly 10 further comprises a reel retaining plate member 30 having an inner knob sleeve 31 and radial appendages 32 having reel engaging surfaces for engaging the front side of a reel member. Appendages 32 are arranged radially in the same manner as are slots 16 of reel 11 and screws 26 of drum 25, and if said appendages are placed in registration with the slots, then a reel may be moved over member 30.

Figure 3:
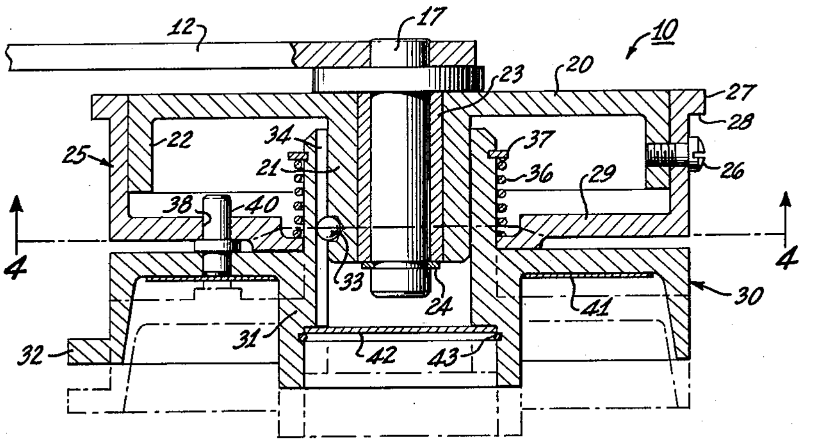
FIG. 3 is an enlarged section of the reel hub assembly shown in FIG. 2.
Figure 4:
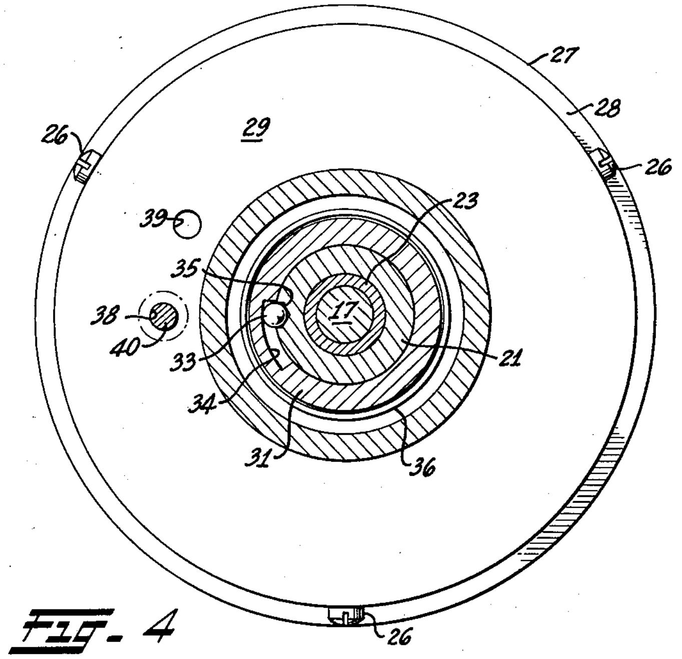
FIG. 4 is a section taken on line 4—4 of FIG. 3.

Knob sleeve 31 has an inner diameter slightly greater than the outer diameter of the hub sleeve 21 and is adapted to be moved angularly and axially with respect thereto. However, the degree of both types of movements is limited by a ball detent 33. As best shown in FIGS. 3 and 4, the internal surface of sleeve 31 is formed with a groove 34, and a pocket groove 35 is formed in the outer surface of hub sleeve 21 for receiving the ball 33. Since groove 34 is substantially larger both axially and angularly than the diameter of ball 33, sleeve member 31 can be moved relative to hub sleeve 21 until said ball contacts the edges of groove 34.

The angular size of groove 34 is arbitrarily selected to insure a distinct and sufficient turning for locking reel 11 to the hub assembly. A turning angle of 30° may be used with satisfaction although other angles may also be employed. The axial length of groove 34 may be formed any suitable length. It will be noted, however, that the degree of axial movement between sleeves 21 and 31 will determine the range of reel widths that may be attached to the hub assembly. This will be evident since the range of distances between backing flange 27 and the facing appendages 32 will depend upon the relative axial movement between hub sleeve 21 and sleeve 31.

Reel retaining plate member 30 is held to reel drum 25 by a coiled compression spring 36 having opposite ends pushing against the interior surface of plate 29 and a retainer ring 37, said ring being secured in a circumferential groove at the end of knob sleeve 31. Spring 36 also urges the reel retaining member toward the backing surface 28, causing a tape reel to be clamped between flange 27 and appendages 32 and effecting an automatic adjustment and take-up for various widths of reels.

Assembly 10 further comprises a means for locating reel retaining member 30 relative to hub sleeve member 21 in reel locking and reel unlocking positions. Angularly spaced locating slots 38 and 39 are formed in plate 29, and each slot is adapted for receiving the end of a locator pin 40 that is mounted to reel retaining member 30. The angular spacing between slots 38 and 39 is made equal to the permissible angular movement between hub sleeve member 21 and sleeve member 31, and when said hub sleeve member and sleeve member occupy one of the two extremes of relative angular movement, pin 40 will be axially aligned with one of the locating slots. This relationship is most clearly illustrated by FIG. 4.

As an aid to operation, an instrution plate 41 is secured within the recessed outer surface of reel retaining plate member 30. Plate 41 may be provided with lettering and arrows indicating the direction for turning the knob sleeve 31, as well as instructing that the knob should be lifted before turning.

A spindle cover plate 42 is disposed within the cavity of knob sleeve 31 to prevent foreign matter from entering. As shown, plate 42 is held against an internal shoulder by a retainer ring 43.

The operation of the reel hub assembly shown will be apparent in view of the above description of parts. To place the tape reel 11 upon assembly 10 it is necessary that appendages 32 be axially aligned with screws 26; and to obtain such an alignment locator pin 40 is mated with slot 38. If pin 40 is otherwise positioned, the registration may be accomplished merely by lifting knob sleeve 31 against the biasing force of spring 36 to remove pin 40 from slots 39 and properly rotating said knob until detent 33 abuts against the edge of groove 34. Then, aligning slots 16 of reel 11 with appendages 32, said reel may be moved axially over the retainer plate 30 and keyed to the drum 25 by the heads of screws 26. Knob 31 is again lifted, appendages 32 being moved through slots 16 and beyond the side surface of reel 11, and then rotated to its other extreme position. When knob 31 is released, spring 36 will force appendages 32 against the sides of reel 11 and the locator pin 40 will become keyed with slot 39, preventing inadvertent turning of said knob to its unlocking position. Obviously, to remove a tape reel the procedure is reversed.

It is to be understood that the form of the invention herewith shown and described is to be taken as a preferred example thereof and that various changes may be made in the shape, size and arrangement of certain parts without departing from the spirit of the invention or the scope of the attached claims, and each of such changes is contemplated.

We claim:

1. A reel hub assembly comprising means for supporting a tape reel including a reel drum and an inner hub sleeve member and having a backing surface, said hub sleeve member defining a groove formed in its surface, a reel retaining member having a reel engaging surface and being mounted to said hub sleeve member, said reel retaining member defining a groove complementary to said hub sleeve member groove, means confined within a portion of each of said grooves for limiting the degree of axial and angular movements of said reel retaining member relative to said hub sleeve member, biasing means urging said reel retaining member toward said backing surface, and means for locating said reel retaining member relative to said hub sleeve member in reel locking and reel unlocking positions.

2. The reel hub assembly of claim 1 wherein said reel drum is formed with angularly spaced locating slots, and said reel retaining member is provided with a locator pin adapted for engaging one of said slots when properly aligned therewith, said slots being spaced an angular amount equal to the angular degree of movement with which said reel retaining member can be positioned relative to said hub sleeve member.

3. A hub reel assembly comprising means for supporting a tape reel including a reel drum and an inner hub sleeve member having a backing surface, means for keying said reel to said hub sleeve member, a reel-retaining member having a reel engaging surface and being mounted to said hub sleeve member for limiting axial and angular movements relative thereto, said hub sleeve member defining a pocket groove formed in its exterior surface and said reel-retaining member defining an axially slotted groove formed on an interior surface of said sleeve surface, said slotted groove being of substantially greater angular width and axial depth than said pocket groove, a ball detent confined within said pocket groove and a portion of said slotted groove limiting the degree of axial and angular movements of said reel-retaining member relative to said hub sleeve member, means providing angularly spaced locating slots and an associated locator pin for establishing reel locking and reel unlocking positions of said reel-retaining member relative to said hub sleeve member, said locating slots being formed in one of said members and said locator pin being mounted on the other member, biasing means urging said reel-retaining member toward said backing surface and causing said locator pin to be inserted into and retained within a locating slot when aligned therewith.

4. A reel hub assembly comprising a backing plate for supporting a tape reel and including a centrally formed hub sleeve member adapted to be rotatably mounted upon a spindle, a reel drum secured to said backing plate and providing a backing surface for a tape reel, a reel-retaining member rotatably mounted on the axis of said hub sleeve member, having lateral appendages complementary and registrable with slots provided in tape reels to be used with said hub assembly, said appendages providing facing surfaces for engaging a tape reel after said reel is mounted upon said reel drum and said reel-retaining member is rotated, placing said appendages out of registration with the slots of the tape reel, said hub sleeve member defining a pocket groove formed in its exterior surface and said reel-retaining member defining an axially slotted groove formed on the interior of said sleeve surface, said slotted groove being of substantially greater angular width and axial depth than said pocket groove, a ball detent confined within said pocket groove and a portion of said slotted groove limiting the degree of axial and angular movements of said reel-retaining member relative to said hub sleeve member, a helical coil spring urging said reel-retaining member toward said backing surface, and means for locating said reel-retaining member relative to said hub sleeve member in reel locking and reel unlocking positions.

References Cited in the file of this patent

UNITED STATES PATENTS 2,960,278 Tronslin ---------------- Nov. 15, 1960
2,992,788 Hardison ---------------- July 18, 1961

FOREIGN PATENTS 851,307 Great Britain ------------ Oct. 12, 1960